United States Patent
Burns et al.

(10) Patent No.: US 8,532,177 B2
(45) Date of Patent: Sep. 10, 2013

(54) MOTION ADAPTIVE IMAGE PROCESSING

(75) Inventors: James Edward Burns, Basingstoke (GB); Karl James Sharman, Eastleih (GB); Nicholas Ian Saunders, Basingstoke (GB); Robert Mark Stefan Porter, Winchester (GB)

(73) Assignee: Sony United Kingdom Limited, Weybridge (GB)

( * ) Notice: Subject to any disclaimer, the term of this patent is extended or adjusted under 35 U.S.C. 154(b) by 1206 days.

(21) Appl. No.: 11/950,802

(22) Filed: Dec. 5, 2007

(65) Prior Publication Data
US 2008/0137750 A1 Jun. 12, 2008

(30) Foreign Application Priority Data
Dec. 6, 2006 (GB) .................................. 0624405.7

(51) Int. Cl.
*H04N 11/04* (2006.01)
*H04N 11/20* (2006.01)

(52) U.S. Cl.
USPC ...................... 375/240.12; 348/448; 348/452

(58) Field of Classification Search
USPC ........... 375/240.01, 240.12, 240.19, E07.036; 348/448, 451, 699–701; 382/262, 299, 300
See application file for complete search history.

(56) References Cited

U.S. PATENT DOCUMENTS

| 5,410,356 | A | * | 4/1995 | Kikuchi et al. | 348/452 |
| 5,483,288 | A | | 1/1996 | Hong | |
| 5,488,430 | A | * | 1/1996 | Hong | 348/699 |
| 7,193,655 | B2 | * | 3/2007 | Nicolas | 348/448 |
| 8,000,534 | B2 | | 8/2011 | Sharman et al. | |
| 8,358,374 | B2 | | 1/2013 | Sharman et al. | |
| 2004/0120402 | A1 | * | 6/2004 | Park et al. | 375/240.16 |
| 2006/0274158 | A1 | * | 12/2006 | Tatsumi et al. | 348/222.1 |
| 2007/0103570 | A1 | * | 5/2007 | Inada et al. | 348/252 |
| 2007/0268364 | A1 | * | 11/2007 | Neff et al. | 348/143 |
| 2008/0204593 | A1 | | 8/2008 | Sharman et al. | |
| 2010/0045862 | A1 | | 2/2010 | Burns et al. | |

FOREIGN PATENT DOCUMENTS
JP 2003-141544 5/2003

* cited by examiner

*Primary Examiner* — Hassan Phillips
*Assistant Examiner* — Saba Tsegaye
(74) *Attorney, Agent, or Firm* — Oblon, Spivak, McClelland, Maier & Neustadt, L.L.P.

(57) ABSTRACT

A method of image processing for image conversion, comprises the steps of calculating a difference measure of the difference in pixel values between corresponding blocks of a current image field and a preceding image field, calculating a variability measure of the variability of pixel values from at least one of said corresponding blocks, determining whether the difference measure exceeds the variability measure, and if the difference measure exceeds the variability measure, then setting an inter-image mixing value for each pixel in the corresponding block of the current image field to indicate that the current image field should not be mixed with the preceding image field at that pixel position.

20 Claims, 11 Drawing Sheets

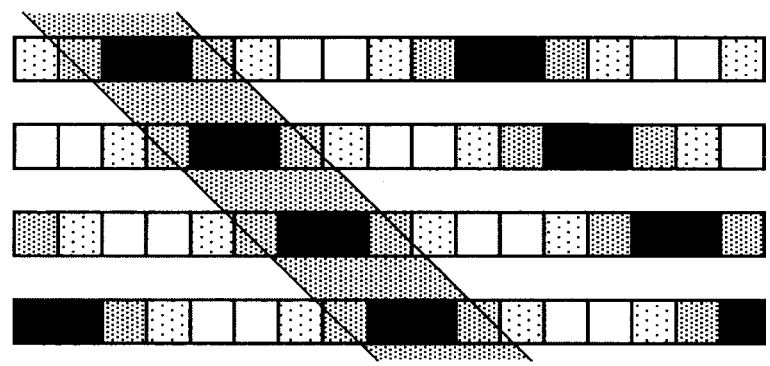
Fig. 8A
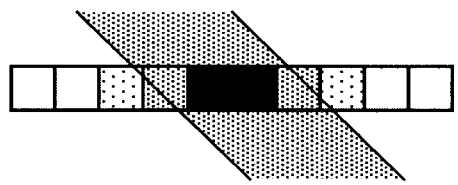
Fig. 8B
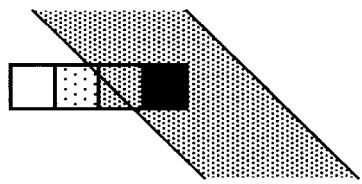          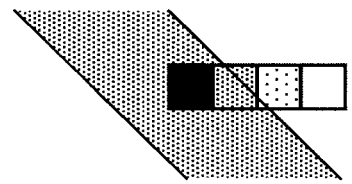
Fig. 8C                Fig. 8D

MOTION ADAPTIVE IMAGE PROCESSING

BACKGROUND OF THE INVENTION

1. Field of the Invention

This invention relates to motion adaptive image processing.

2. Description of the Prior Art

Video image capture represents a spatial and temporal sampling process. An image is captured as a set of pixels arranged in rows or lines. Successive images are captured at spaced instants in time.

A complication is the common use of interlaced video capture and processing. In an interlaced video signal, each image is handled as two sets or fields of alternate lines of pixels. For example, odd numbered lines might be included in one field, whereas even numbered lines could be included in the next field. An advantage of interlaced techniques is that they give an apparent doubling of the image rate, so reducing flicker effects, for no substantial increase in video signal bandwidth.

All of these aspects of sampling can give rise to alias effects if an attempt is made to capture or process video material having spatial or temporal frequencies which are too high for the respective sampling rate. But a particular alias problem will be described here in the area of interlace to progressive scan video conversion.

If it is desired to convert between interlaced video and progressive scan (non-interlaced) video, then for non-moving images it is merely necessary to interleave two successive fields to recreate a non-interlaced frame having all lines of pixels present. However, if there is any significant inter-field motion, this approach may not work. In such circumstances it can be more appropriate to derive the lines of pixels which are missing in one field from other pixels in that same field. In other words an intra-field interpolation process is used.

In practice, a video source may comprise image sequences in which some regions represent moving images whilst some regions do not. For example, when a newscaster speaks to a fixed camera, the newscaster's mouth, face, and head may move considerably, whilst their torso, the desk and the wall behind them do not.

Therefore the different conversion strategies noted above may be appropriate within different regions of the same image. It is therefore important to determine which strategy to use for a given pixel.

Interpolation will generally give a worse result than interleaving for non-moving portions, whereas interleaving and will generally give a worse result than interpolation for moving portions. So, the choice of the more appropriate technique is very important.

In particular, interleaving between image fields generally gives worse results than interpolation of a single image field when there are moving portions of the image because it results in a striped effect in the resultant image as alternate lines taken from different image fields will have visibly different content.

Moreover, under some circumstances it is also possible for successive fields to be visibly different despite a lack of substantial motion. In particular, when there is a sudden change in lighting (for instance, when a light is switched on in a room, or there is lightning or a strobe effect). In such circumstances it is also desirable to avoid interleaving between image fields within affected portions of an image.

It is an object of the present invention to seek to alleviate or mitigate this problem.

SUMMARY OF THE INVENTION

In an aspect of the present invention, a method of image processing comprising the steps of calculating a difference measure of a difference in pixel values between corresponding blocks of a current image field and an adjacent image field, calculating a variability measure of a variability of pixel values in respect of at least one of said corresponding blocks, determining whether the difference measure exceeds the variability measure, and if the difference measure exceeds the variability measure, setting respective inter-image mixing values for pixels in the corresponding block of the current image field to indicate that the current image field should be mixed with the adjacent image field at that pixel position to at most a predetermined extent.

In another aspect of the present invention, an image processing apparatus comprises difference calculation means for calculating a difference measure of a difference in pixel values between corresponding blocks of a current image field and an adjacent image field, variability calculation means for calculating a variability measure of a variability of pixel values in respect of at least one of said corresponding blocks, comparison means for determining whether the difference measure exceeds the variability measure, and data modification means for setting an inter-image mixing value of a pixel, and in which if, in operation, the comparison means determines that the difference measure exceeds the variability measure, then the data modification means sets respective inter-image mixing values for pixels in the corresponding block of the current image field to indicate that the current image field should be mixed with the adjacent image field at that pixel position to at most a predetermined extent.

Advantageously, therefore, the above aspects enable the detection of motion-independent changes to successive image fields, and to set or override existing inter-image mixing parameter values for affected pixels, thereby preventing the use of interleaving during the conversion from interlaced to progressive scan for these pixels and so mitigating the above noted detrimental effects upon image quality.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings in which:

FIGS. 8a to 8d schematically illustrate alias detection techniques;

DESCRIPTION OF THE PREFERRED EMBODIMENTS

Figure 1:
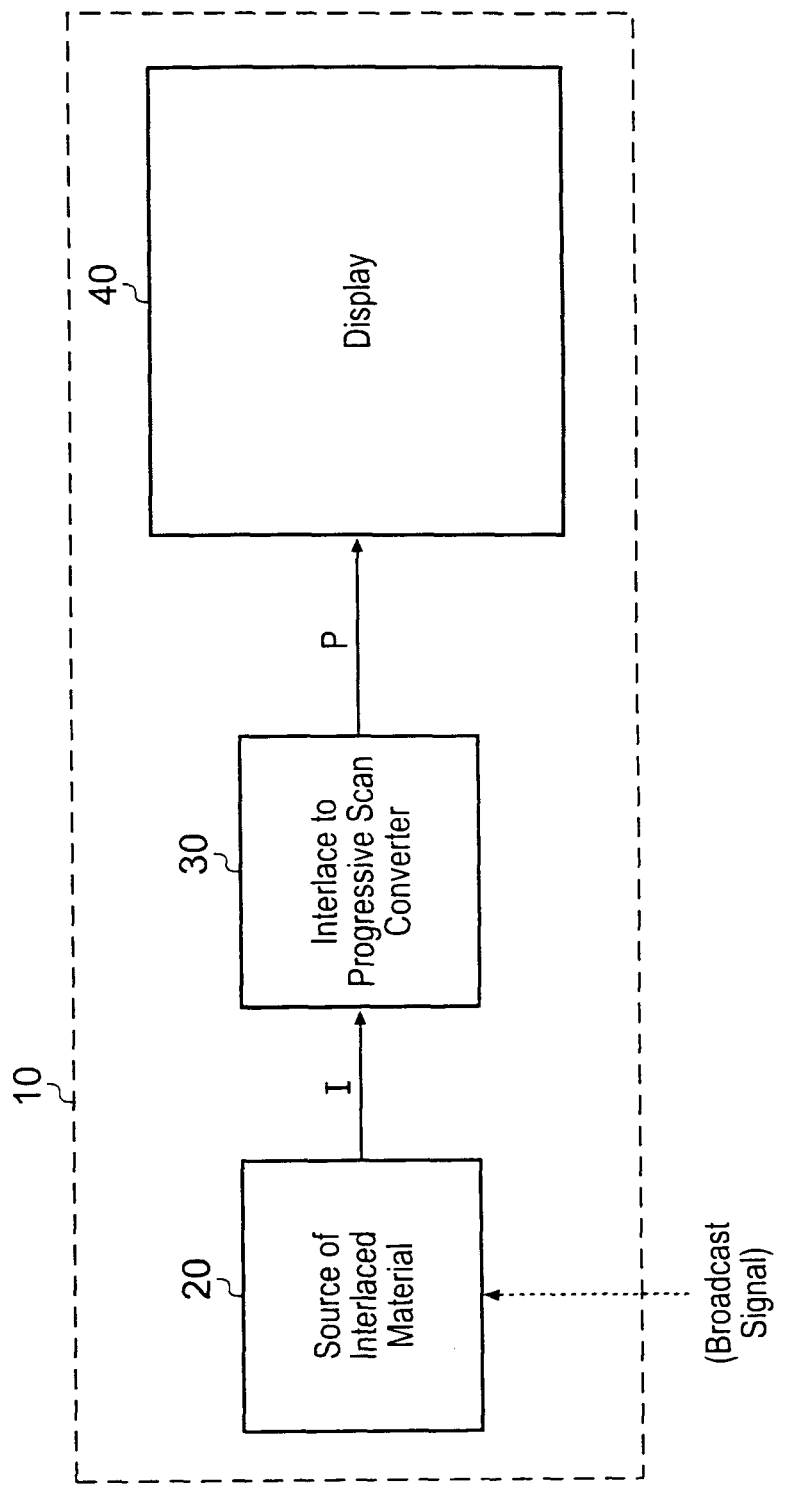
FIG. 1 schematically illustrates a flat-screen display arrangement.

FIG. 1 schematically illustrates a flat screen display arrangement 10 comprising a source of interlaced video material 20, an interlace to progressive scan converter 30 and a display panel 40 such as a liquid crystal (LCD) or plasma display. This illustrates a typical use of interlace to progressive scan conversion, in that many broadcast signals are in the interlaced format whereas many flat panel displays operate most successfully in a progressive scan format. Accordingly, in FIG. 1, a broadcast signal received by the source of interlaced material 20 is used to generate an interlaced signal for display. This is passed to the interlace to progressive scan converter 30 to generate a progressive scan signal from the interlaced signal. It is the progressive scan signal which is passed to the display 40.

It will be appreciated that the source of interlaced material 20 need not be a broadcast receiver, but could be a video replay apparatus such as a DVD player, a network connection such as an internet connection and so on.

Figure 2:
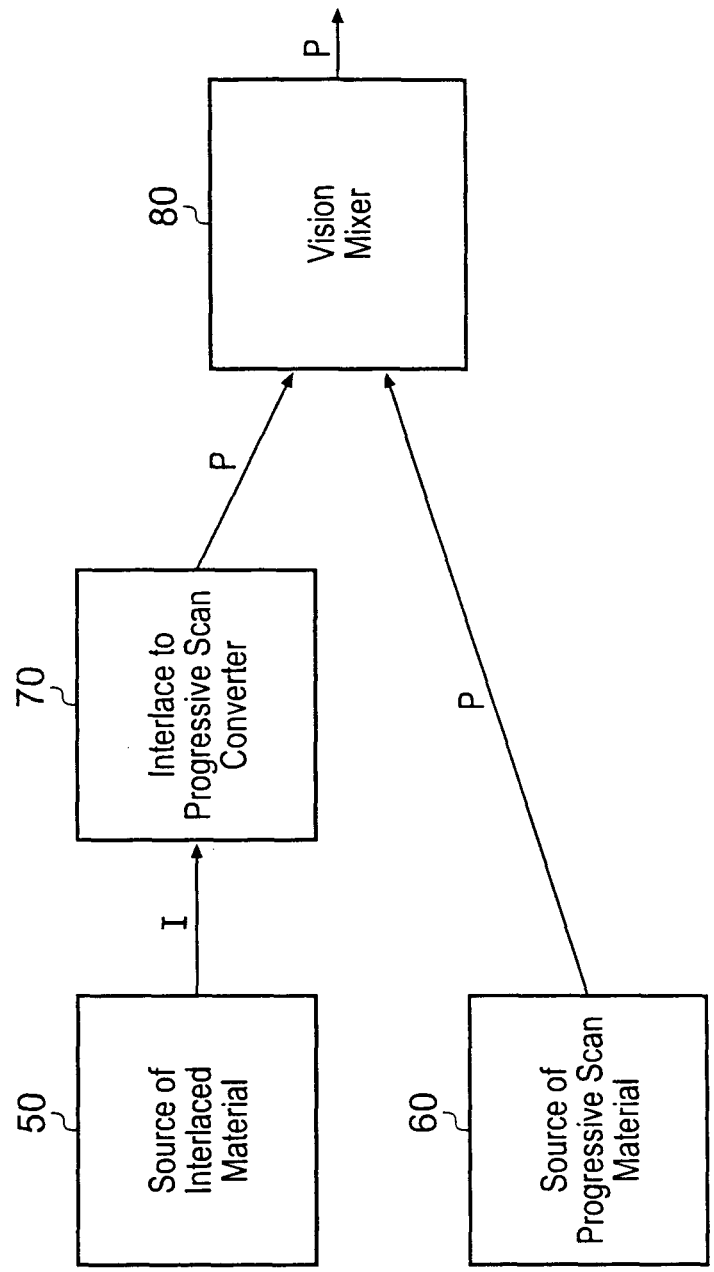
FIG. 2 schematically illustrates video mixing operation in a studio environment.

FIG. 2 schematically illustrates a video mixing operation in a studio environment, in order to give another example of the use of interlace to progressive scan conversion. Here, a source of interlaced material 50 and source of progressive scan material 60 are provided. These sources could be cameras, video replay apparatus such as video tape recorders or hard disk recorders, broadcast receivers or the like.

The interlaced output from the source of interlaced material 50 is supplied to an interlace to progress scan converter 70 to generate a progressive scan signal. This can be processed by the vision mixer 80 along with the progressive scan material from the source 60 to generate a processed progressive scan output. Of course, the progressive scan output of the vision mixer 80 can be converted back to an interlaced format if required, e.g. for subsequent broadcast or recording. It will also be appreciated that the vision mixer 80 is just one example of video processing apparatus; instead, a digital video effects unit, for example, could be used at this position in FIG. 2.

Figure 3:
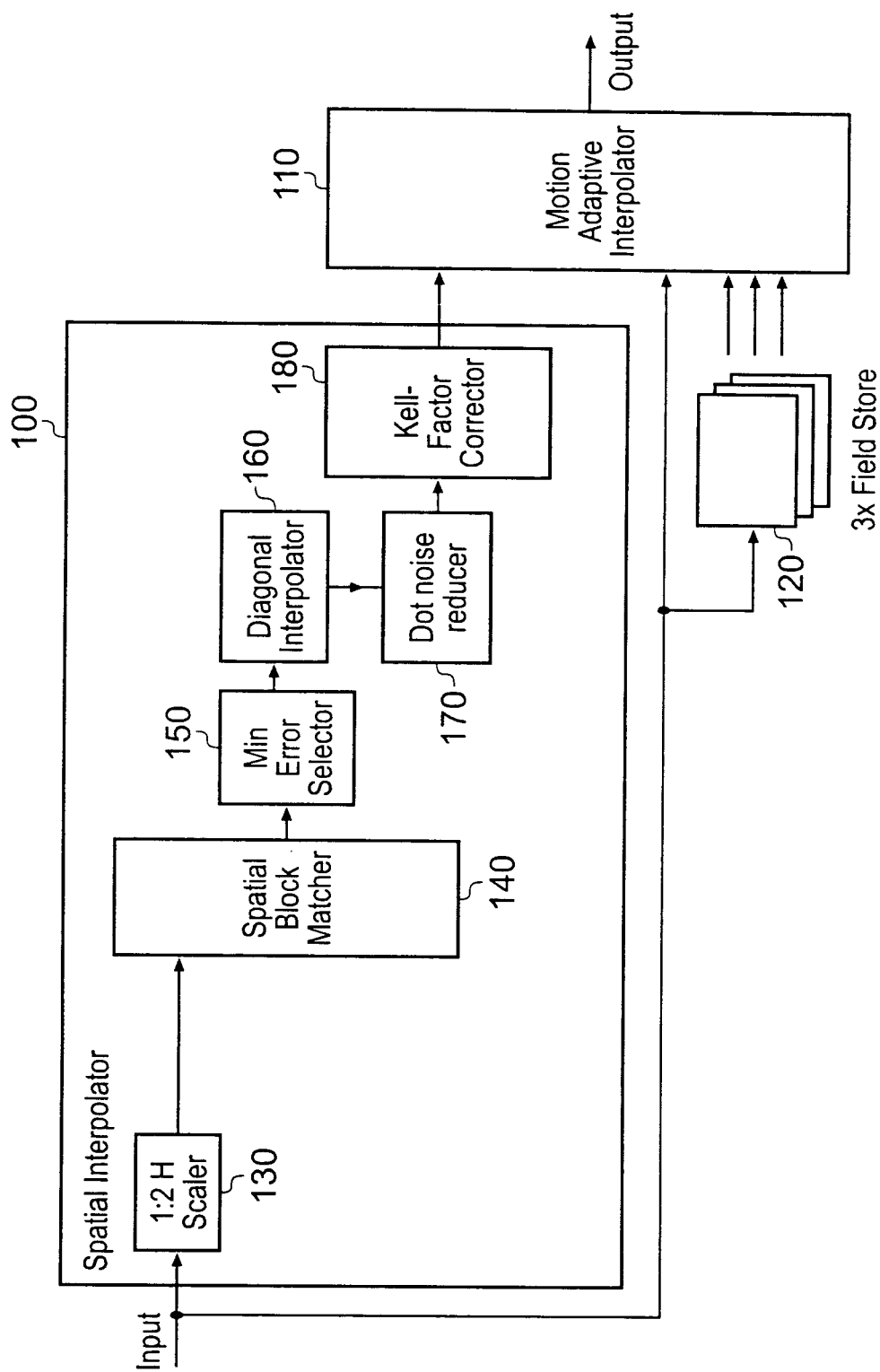
FIG. 3 schematically illustrates an interlace to progressive converter.

FIG. 3 schematically shows an interlace to progressive scan converter. In general terms, the converter comprises an intra-field interpolator such as a spatial interpolator 100, a motion adaptive interpolator 110 and a set of three field stores 120.

The converter of FIG. 3 operates to generate output progressive scan frames at the same repetition frequency as the input interlaced fields. Therefore, a main requirement of the converter is to generate the "missing" pixels in each interlaced field to turn that interlaced field into a progressive scan frame. This can be achieved in one of two ways. On one hand, the spatial interpolator 100 generates the "missing" pixels by spatial interpolation within the field concerned. In other words, this is an intra-field operation. On the other hand, the motion adaptive interpolator generates the missing pixels by inserting pixels from an adjacent field of the opposite polarity. This is valid only if there is no image motion between the fields, so the basic organisation of FIG. 3 is that the output of the spatial interpolator 100 is used at image positions where image motion is detected, while the output of the motion adaptive interpolator 110 is used at pixel positions where image motion is not detected. For simplicity of operation, the spatial interpolator operates at each pixel position, and the motion adaptive interpolator either selects the output of the spatial interpolator, or selects a pixel from another field of the opposite polarity for output, or mixes the two.

The motion adaptive interpolator will be described in more detail below. First, the spatial interpolator will be briefly described.

The spatial interpolator comprises a 1:2 horizontal pixel scaler 130, a spatial block matcher 140, a minimum error selector 150, a diagonal interpolator 160, a dot noise reducer 170 and a Kell-factor corrector 180. The operation of each of these is summarised below.

The scaler 130 uses horizontal linear interpolation to generate one additional pixel value between each two pixels of the input interlaced field (i.e. a 1:2 scaling operation). So, the horizontal resolution (at least in terms of number of available pixel values) is doubled, but no difference is made at this stage to the vertical resolution.

The overall operation of the spatial block matcher 140 and the diagonal interpolator 160 is to detect the orientation of an image feature relevant to a pixel position where a new pixel is to be interpolated, and then to apply an interpolation along that image feature direction. So, if a current pixel position to be interpolated lies within a diagonal image feature (a line, an edge etc.) at, say, 45° to the horizontal, interpolation of that new pixel would take place along that 45° direction. This can tend to give a better output result than restricting the interpolation to horizontal or vertical interpolation. A key part of this process, clearly, is therefore to detect the direction of an image feature at each pixel position.

Figures 4A, 4B, 4C:
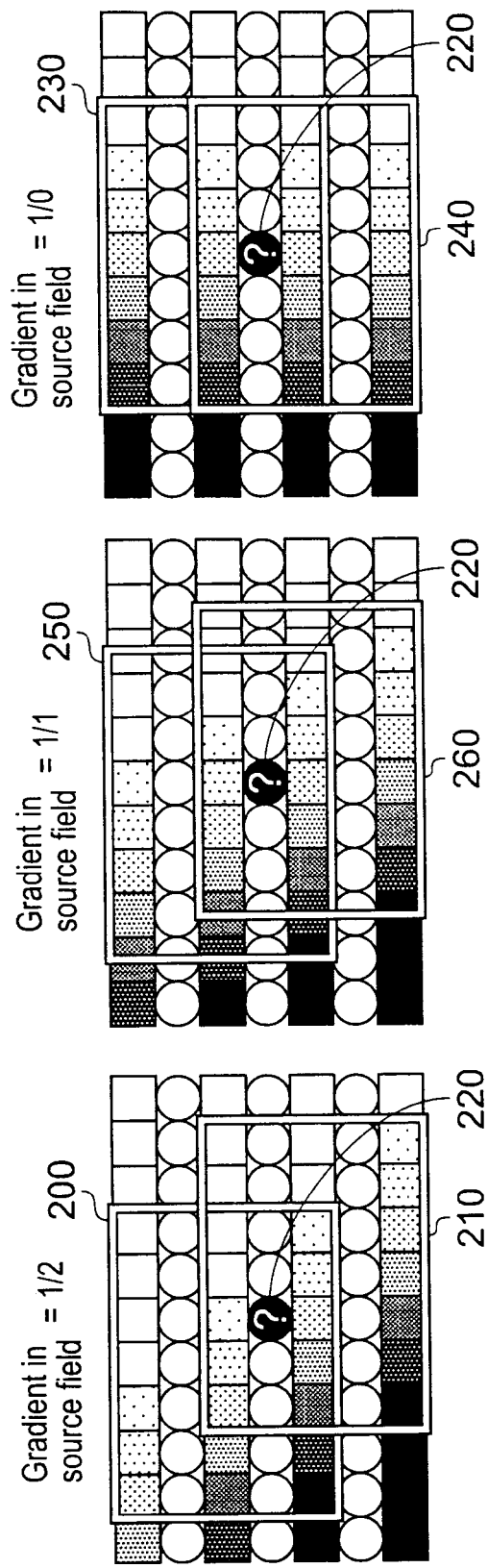
FIGS. 4a to 4c schematically illustrate gradient detection.

Referring now to FIGS. 4A-4C, this detection is carried out using a block matching process. FIG. 4A schematically illustrates a successful block match between two blocks 200, 210 of pixels around the position of an unknown pixel 220 (a circle with a question mark inside). Indeed, the notation used in the present drawings is that a square indicates a known pixel whereas a circle indicates a pixel to be interpolated by the diagonal interpolator 160. The shading in FIGS. 4A to 4C is a schematic representation of an image feature.

So, referring to FIG. 4A, a successful block match is obtained between the blocks 200, 210 around the unknown pixel position 220, indicating a gradient of an image feature of ½.

Turning now to FIG. 4C, an image feature is vertical and there is again a successful block match between overlapping blocks 230, 240.

However, in FIG. 4B, the image feature has a gradient of 1/1. It is not possible to obtain a successful block match with the blocks at integral pixel positions. A successful match between blocks 250, 260 occurs at a half integral pixel position. Accordingly, in order to detect gradients of this nature (indeed any gradients sharper than ½), it is necessary to operate at a sub-pixel accuracy. In the present case, a half-pixel accuracy was adopted, by using pixels from the 1:2 scaler. If a greater accuracy still was used, (e.g. quarter-pixel accuracy) then gradients yet closer to vertical could be detected.

FIGS. 5 and 6A to 6E schematically illustrate the spatial block matching operation.

As noted above, spatial block matching is carried out at sub-pixel accuracy; in this case half-pixel accuracy.

A range of block sizes is used, with corresponding search ranges (maximum displacements relative to the pixel position under test). Taking into account the 1:2 scaling operation, example block sizes and search ranges are given in the following table:

| Block Size (in scaled pixels) | Search Range (in scaled pixels) |
|---|---|
| 3v × 5h | 0h |
| 3v × 5h | ±1h |
| 3v × 7h | ±2h |
| ... | ... |
| 3v × 41h | ±19h |

Figure 5:
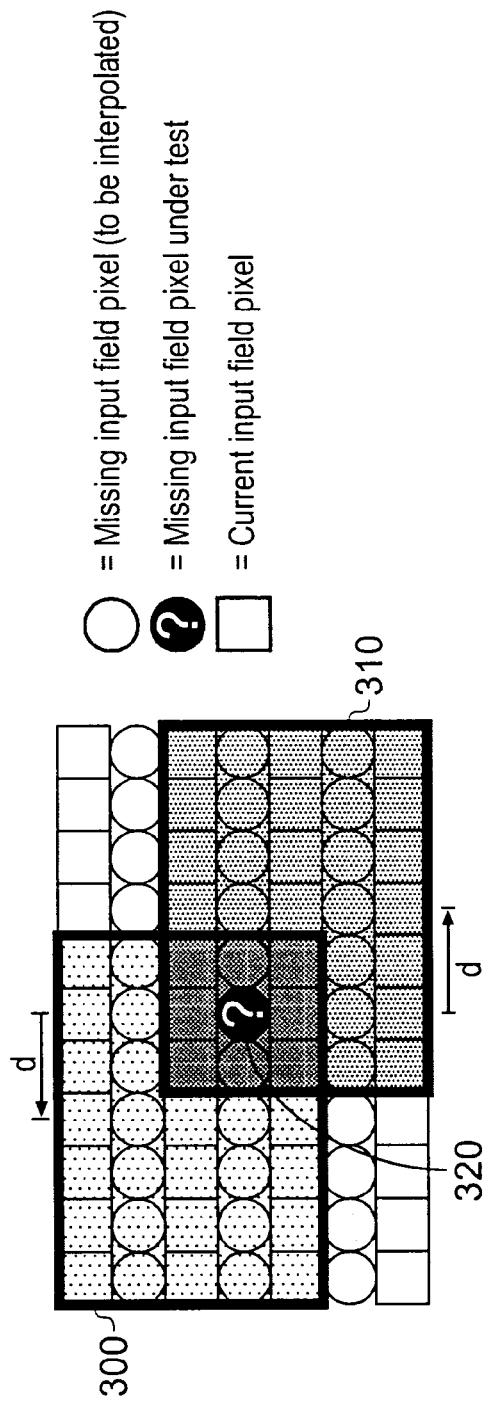
FIGS. 5 and 6a to 6e schematically illustrate a spatial block matching operation.
Figure 6C:
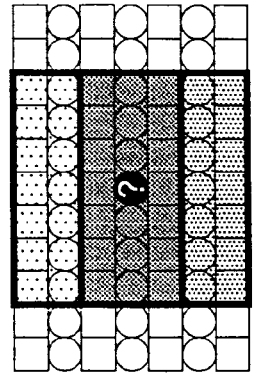
Figure 6B:
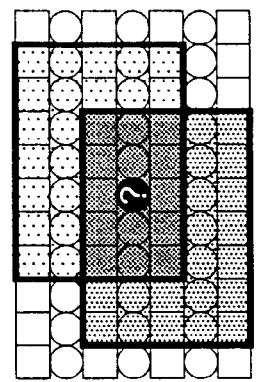
Figure 6A:
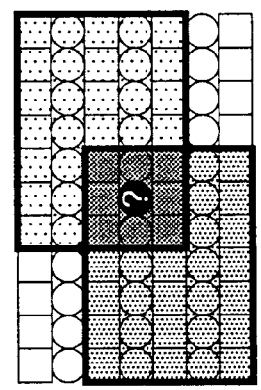
Figure 6E:
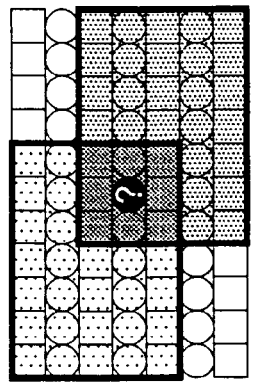
Figure 6D:
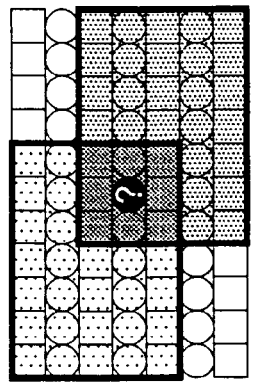

FIG. 5 schematically illustrates a block match operation between two blocks of 3v (vertical) by 7h (horizontal) pixels 300, 310, around an unknown pixel position 320. The variable d signifies a horizontal displacement of the block's horizontal centre from the pixel position under test. A condition applied to the block matches is that the blocks must always overlap the pixel position under test. Also, the blocks are shown displaced in integral numbers of real pixel displacements (so a displacement of m corresponds to a displacement of 2m interpolated pixels). Accordingly, the particular block size shown in FIG. 5 allows nine possible tests including at a displacement of −2 pixels (FIG. 6A) −1 pixel (FIG. 6B), 0 pixels (FIG. 6C), +1 pixel (FIG. 6D), and +2 pixels (FIG. 6E).

Note that the displacement is indicated as a displacement from the centre. The two blocks are displaced by equal amounts, though in opposite directions. Symmetrical displacements are used because otherwise the block matching could detect lines or edges which are not relevant to the pixel under test.

A sum of absolute differences (SAD) is calculated for each block match. This is defined as:

$$SAD(x, y, d, n) = \sum_{dx=-n}^{n} \sum_{dy=-3,-1,1} \sum_{RGB/YCbCr} |p(x-d+dx, y+dy) - p(x+d+dx, y+dy+2)|$$

where x, y represent the current pixel co-ordinate (y being a frame line number), d is the displacement being tested, and n is the "radius" of the block (the block width is n'=2n+1).

In general terms, the SAD values for three colour components (red, green and blue) are combined, and a minimum normalised SAD value determines a gradient for interpolation. Various checks are made to avoid poor interpolation, as described below.

Figure 7A:
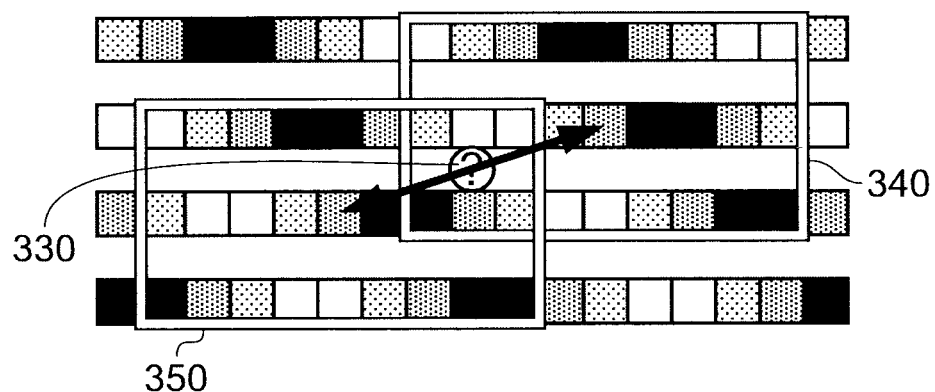
FIGS. 7a and 7b schematically illustrate an alias situation.
Figure 7B:
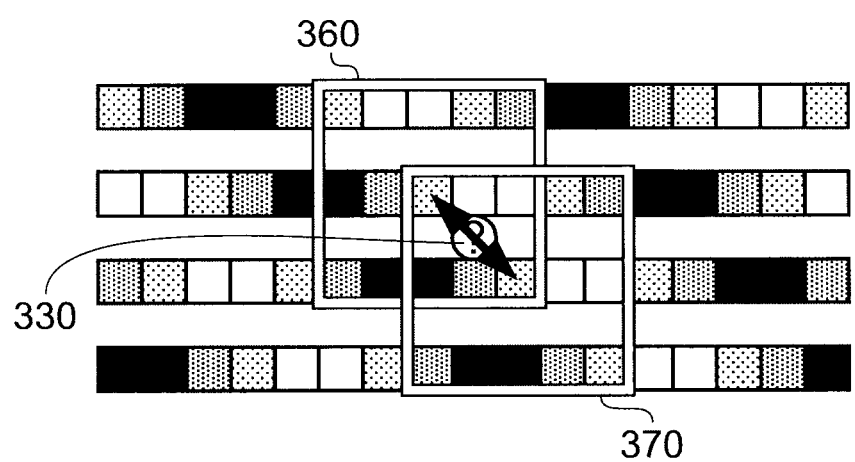

Measures are taken to avoid problems caused by alias situations. FIGS. 7A and 7B illustrate a possible alias situation.

Referring to FIG. 7A, a block match between blocks 340 and 350 suggests that an unknown pixel 330 should be a dark grey colour. Here, the block match is 100% successful and so the SAD value would be zero (note that this is a schematic example!)

However, in FIG. 7B, a block match between blocks 360 and 370 is also 100% successful, again giving a SAD value of zero. The block match of FIG. 7B suggests that the unknown pixel 330 should be a light grey colour.

This conflict of block match results is a product of aliasing between the closely spaced diagonal image features in the image portions shown in FIGS. 7A and 7B. While it may at first appear that either diagonal line is equally valid (i.e. a steep diagonal line from upper left to lower right or a more gentle diagonal line from upper right to lower left), a processing rule has been set up to allow an appropriate selection to be made.

The basis of the rule is that the block match process is restricted so that only areas considered to be "line segments" are detected. That is to say, each block in a block match should contain a line segment.

A digitised line segment is considered to have two properties. Firstly, it is monotonic along the central scan line row of the block in question, and secondly there is a vertical transition between scan lines in the block in question. The way in which these properties may be tested will be described with reference to FIGS. 8A to 8D.

In FIG. 8A, a source field contains multiple diagonal lines. FIG. 8B schematically illustrates one row of pixels within the image of FIG. 8A. FIGS. 8C and 8D illustrate the two edges of the diagonal line shown in FIG. 8B. It will be seen that each of these edges has a region of pixels which show a monotonic variation in luminance. Also, referring back to FIG. 8A, it can be seen that such segments exhibit a vertical transition between adjacent rows of pixels.

So, turning back to FIGS. 7A and 7B, the block match of FIG. 7A would be rejected in favour of the block match of FIG. 7B according to the rule described above. This is because the central line of pixels of the two blocks of FIG. 7B shows a monotonic variation in luminance, whereas the centre line of pixels of the blocks 340, 350 in FIG. 7A does not.

The tests are performed separately in respect of each of the colour components (e.g. R, G and B). All three tests must be passed separately. Alternatively, for example to save hardware, fewer than three tests could be performed. For example, only the luminance, or only one colour component, might be tested. Of course, a YCbCr or YPbPr representation could be tested instead.

The diagonal interpolator 160 is a simple pixel averager: given a direction it picks the pixel in that direction on the line below and the pixel in that direction on the line above and averages them.

The dot noise reducer 170 involves a process which is applied to the output of the diagonal interpolator 160. A test is applied to detect whether an interpolated pixel lies within the maximum and minimum values of four neighbouring vertical and horizontal pixels, i.e. the pixels immediately above, below, left and right of the interpolated pixel. Note that the pixels above and below the interpolated pixel will be real pixels, whereas those to the left and right will be interpolated themselves.

If the interpolated pixel does not lie within this range, then;
Let v be the original value of the pixel under consideration, and let v' be v, clipped to lie within the range of the four locally neighbouring pixels.

Let the new pixel value be kDNR v'+(1−kDNR)v, where kDNR is a programmable constant.

The operation of the Kell-factor corrector 180 will now be described.

In the present discussion, references to the Kell-factor are simply to help explain the operation of this part of an exemplary system. What the filter is actually exploiting is simply the knowledge that the source image did not use the full bandwidth available to it, whether that is because of scanning artifacts or because of a low pass filtering process.

The Kell-factor is a quantity which represents a property of progressive scan and interlaced images. In order to represent the information being scanned, it is generally considered that only 70% (the Kell-factor) of the possible vertical bandwidth is (or should be) represented. Hence when performing an interlace to progressive scan conversion, it is potentially hazardous to attempt to produce a full vertical bandwidth image. Instead, a compensation to account for a Kell-factor of less than unity may be used.

One method to compensate for the Kell-factor would be to use a 70% bandwidth filter on the frame output of any interlace to progressive scan algorithm. However, one of the fields in the frame is 'real' data—i.e. it was sampled correctly, so the content arising from that field must by definition be perfect. Thus a method to filter just the interpolated lines is used.

Figure 9A:
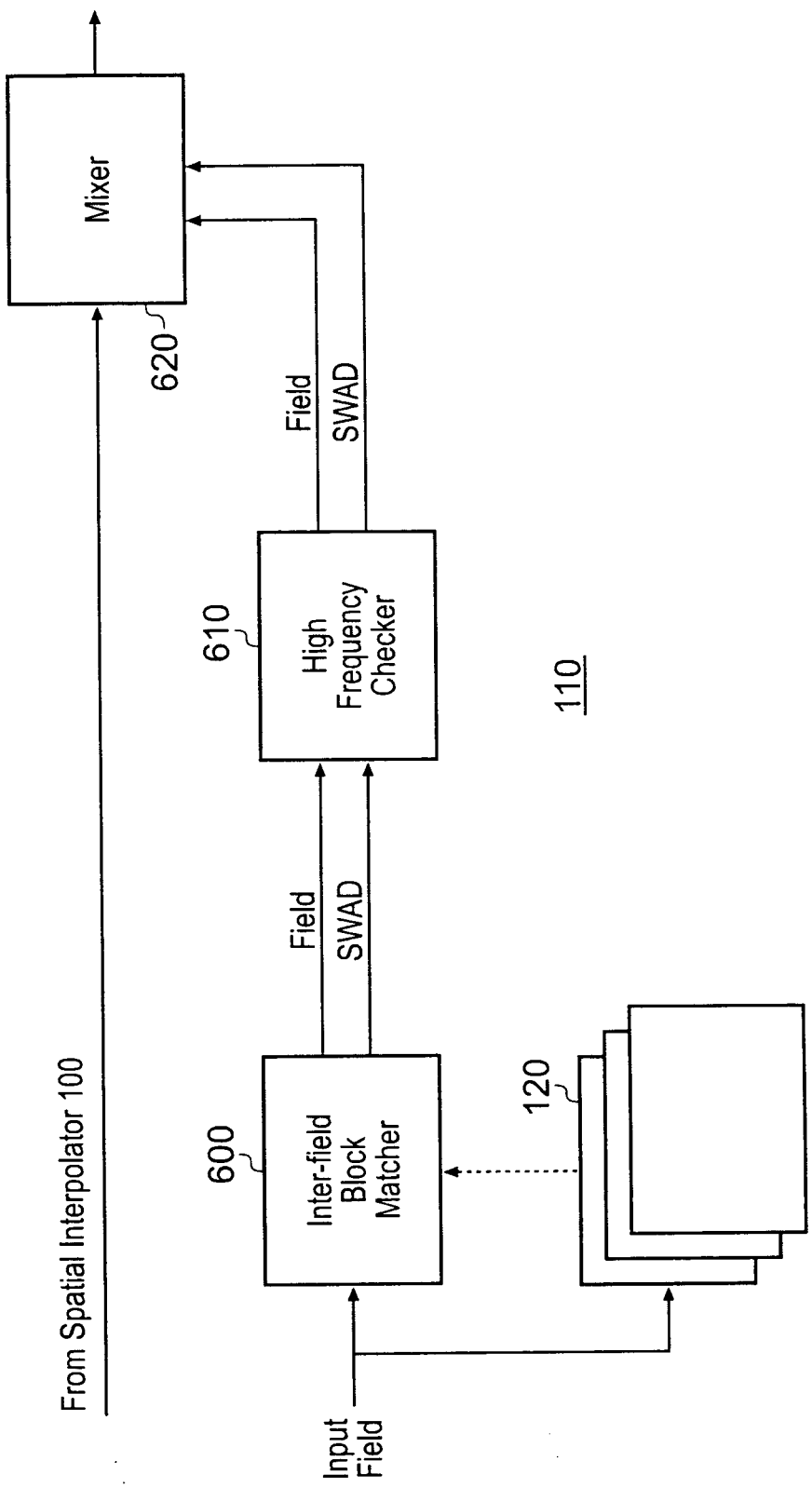
FIG. 9a schematically illustrates a motion adaptive interpolator.

FIG. 9a schematically illustrates the operation of the motion adaptive interpolator 110. The interpolator 110 comprises and inter-field block matcher 600, an optional high frequency checker 610 and a mixer 620.

Figure 9B:
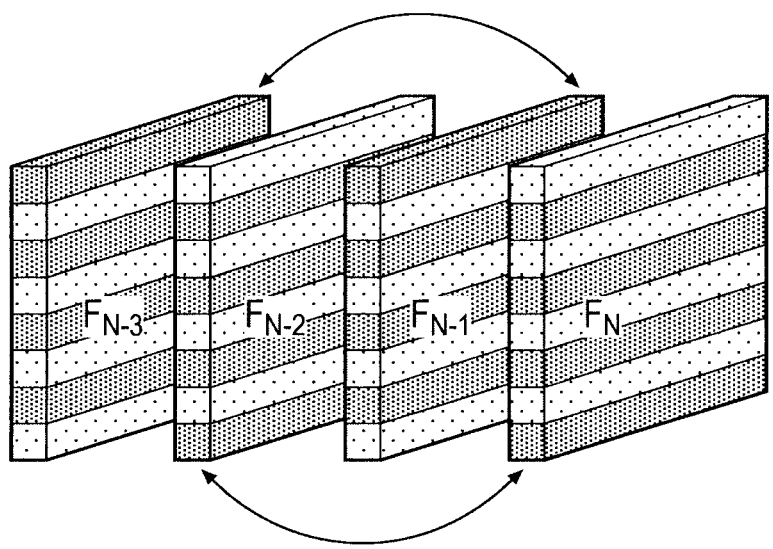
FIG. 9b schematically illustrates motion detection between successive video fields.

The inter-field block matcher 600 uses data from the current input field and the three field stores 120 to carry out inter-field motion comparisons. This involves comparing blocks of pixels the current field ($F_N$ in FIG. 9b) with correspondingly positioned blocks in the previous field of the same type ($F_{N-2}$) and likewise comparing the preceding field ($F_{N-1}$) and the previous field of the same type ($F_{N-3}$). The results of these comparisons are used to detect a degree of motion in the image.

In particular, weighted sums of absolute differences (SWADs) are generated as follows.

Four block matches are performed to produce two SWADs, $SWAD_{AREA}$ and $SWAD_{LOCAL}$. These are:
 a 5hx4v weighted block match on fields $F_N$ and $F_{N-2}$.
 a 5hx3v weighted block match on fields $F_{N-1}$ and $F_{N-3}$.
 a 1hx1v weighted block match on fields $F_{N-1}$ and $F_{N-3}$.
 a 1hx2v weighted block match on fields $F_N$ and $F_{N-2}$.

Weighted block matches sum weighted absolute differences between coincident pixels, SWAD.

$$SWAD = \sum_{dx=-2}^{2} \sum_{dy=-2,0,2} \sum_{RGB/YCbCr} w(dx, dy) |F_{N-1}(dx, dy) - F_{N-3}(dx, dy)|$$

where $F_{N-1}(dx,dy)$ is the value at the frame-relative position dx, dy to the current pixel.

Typical values for the weights are:

| | |
|---|---|
| 5hx4v block: [ | 12/1024 23/1024 28/1024 23/1024 12/1024 |
| | 32/1024 62/1024 77/1024 62/1024 32/1024 |
| | 32/1024 62/1024 77/1024 62/1024 32/1024 |
| | 12/1024 23/1024 28/1024 23/1024 12/1024 ] |
| 5hx3v block: [ | 20/1024 39/1024 48/1024 39/1024 20/1024 |
| | 48/1024 94/1024 117/1024 94/1024 48/1024 |
| | 20/1024 39/1024 48/1024 39/1024 20/1024 ] |
| 1hx2v block: [ | 128/256 |
| | 128/256 ] |
| 1hx1v block: [ | 255/256 ]  - effectively no weighting. |

Summing the first two SWADs gives an area-based block match, $SWAD_{AREA}$

Summing the latter two SWADs gives a localised block match, $SWAD_{LOCAL}$

All three colour components contribute to the SWADs in the same manner. The system need only maintain a SAD of the three components for each pixel, which is then weighted and combined with the values from the other pixels in the block. This means that this aspect of the process requires only 5 line stores of about 10 bpp (bits per pixel).

Optionally, the high frequency checker 610 is arranged to detect high frequencies in the input fields. The algorithm is based on the following principle. If interleaving the two source fields produces a lot of high frequency energy, then it is appropriate to try to make sure that the inputs are reasonably static. Only static video can produce reliable high frequencies; highly aliased motion can produce high frequencies, but this is not a desirable situation for inter-field interpolation. If motion is present, then high frequencies may be produced where the fields are incorrectly interleaved.

Figure 10:
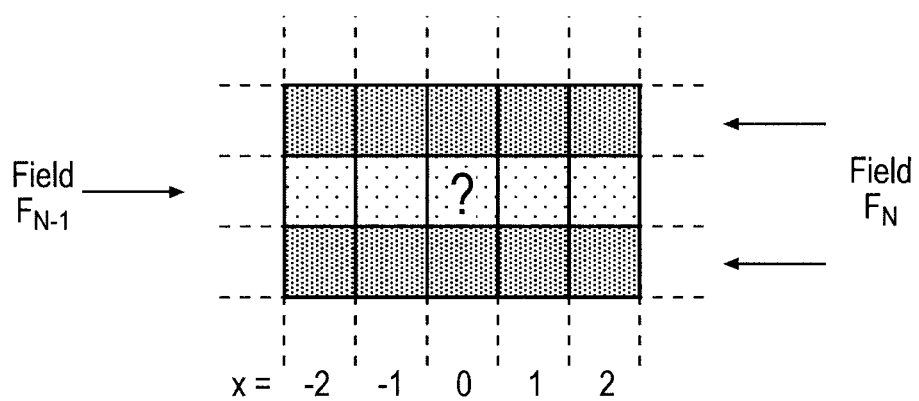
FIG. 10 schematically illustrates a high frequency check operation.

Referring to FIG. 10, the high frequency checker uses the lines above and below the currently interpolated pixel from the current field $F_N$ and the line from the preceding field $F_{N-1}$ that corresponds to the missing line. The HFC may be considered as a 5×3 pixel neighbourhood check.

Let $HFC_{thresh1}$ and $HFC_{thresh2}$ be two programmable constants, with the former greater than the latter.

Set a flag: exceededHighEnergy=false

Over each component (or a subset of them) (RGB/YPbPr)—where YPbPr indicates the colour space in a high definition system, in a similar way to YCbCr in a standard definition system:

Set energy=0

For the pixels having a horizontal position x=−2, −1, 0, 1, 2 (relative to the current pixel), let the interleaved ($F_{N-1}$) field value be $v_0$, and the current field value of the line above and below be $v_{-1}$ and $v_1$, then:
 if $v_0 < \min(v_1, v_{-1})$, set diff=$\min(v_1, v_{-1})$−v0
 else if v0>$\max(v_1, v_{-1})$, set diff=v0−$\max(v_1, v_{-1})$
 else set diff=0
 If (diff>$HFC_{thresh1}$), set energy=energy+($HFC_{thresh1}$−$HFC_{thresh2}$)*weighting[x]
 else if (diff>$HFC_{thresh2}$), set energy=energy+(diff−$HFC_{thresh2}$)*weighting[x]
 If energy>$HFC_{allowance}$, set flag exceededHighEnergy=true This ends the processing carried out over each component.

Subsequently, if exceededHighEnergy=true, increase $SWAD_{AREA}$ by a programmable constant value, $HFC_{penalty}$.

The increase in $SWAD_{AREA}$ will tend to act against the use of the motion adaptive pixel at that output position.

The mixer 620 operates according to the criteria $SWAD_{AREA}$ and $SWAD_{LOCAL}$ and also various thresholds $thresh_{1,2,etc}$.

If $SWAD_{LOCAL}$>$thresh_1$, use only spatially interpolated field, $F_{N'}$.

Else if $SWAD_{AREA}$>$thresh_2$, use only spatially interpolated field, $F_{N'}$, only Else if $SWAD_{AREA}$<$thresh_3$, use only field $F_{N-1}$ Else mix field $F_{N-1}$ and $F_{N'}$:
 let $\alpha$=($thresh_2$−$SWAD_{AREA}$)/($thresh_2$−$thresh_3$)

The resulting pixel value=$\alpha F_{N-1}$+$(1-\alpha)$ $F_{N'}$. In other words, α represents pixel motion and determines contributions from the intra and inter-field interpolators.

Whilst only $F_{N-1}$ and $F_{N'}$ are mixed in the above equation, it will be appreciated that additional image fields or portions thereof may be mixed with $F_{N-1}$ and $F_{N'}$ at a given pixel position, for example the unfiltered lines of $F_N$ for alternate lines of the image, or earlier image field $F_{N-3}$ if there is substantially no motion at all.

As noted previously, it will be understood that areas of image fields where there is rapid motion should not be interleaved, as this will result in a striping or striation of the resultant image as alternate lines taken from different image fields will have visibly different content.

However, under some circumstances it is also possible for successive image fields to be dissimilar despite a lack of substantial motion. In particular, when there is a sudden change in lighting (for instance, when a light is switched on in a room, or there is lightning or a strobe effect), this may not be detected by the SWAD analysis described above.

Consequently in an embodiment of the present invention, a means to detect such circumstances is provided that overrides the value of α calculated above, setting it to indicate motion and thus prompting a spatial interpolation of the relevant area of the image rather than a use of image interleaving.

In an embodiment of the present invention two corresponding blocks, respectively comprising all or part of successive image fields, are determined to have a large field difference (irrespective of motion) if they satisfy the inequality $$|DC_N - DC_{N-1}| > (SD_N + SD_{N-1})/2,$$

where $DC_{N,N-1}$ are the mean values of pixel data of the corresponding blocks in the current and preceding image fields, and $SD_{N,N-1}$ are the standard deviations of the pixel data from those blocks.

Thus, when the difference between the mean pixel values of corresponding blocks from image fields N and N-1 exceeds the average standard deviation of pixel values from these blocks, then the blocks are categorised as having a large field difference.

The relevant pixel values typically relate to luminance and/or chrominance. For example, the pixel value may be a respective sum or average of red, green and blue channels, indicating luminance. Alternatively, any or all separate colour channels may be used directly or as difference signals to indicate chrominance. In the latter case, an inequality as disclosed above may be used for each selected colour channel, and a large field difference is determined if any one of the inequalities is satisfied.

When a block in the current image field (field N in the above expression) is categorised as having a large field difference, the α values of pixels in that block are set to zero. In addition, optionally the α values of pixels in all blocks immediately neighbouring that block are also set to zero.

When $\alpha=0$, the resulting pixel value $\alpha F_{N-1}+(1-\alpha)F_{N'}$ reduces to $F_{N'}$, i.e. solely the spatially interpolated version of the image at that pixel.

Thus by forcing $\alpha=0$ in this manner, only spatial interpolation will be apparent in those parts of the converted image corresponding to blocks categorised as having a large field difference and so modified to have α values of zero.

In an embodiment of the present invention, blocks 32 pixels horizontal and 16 pixels vertical are used in the above test. It will be appreciated however that blocks of any suitable size can be used, although if the blocks are too small then the mean and standard deviation values used to determine a large field difference may become unreliable. Blocks near one or more edges of the image may be expanded to include remaining pixels up to the edge.

Modifying α values over a block in the manner described above can however result in visible discontinuities between modified blocks and neighbouring unaffected areas that may instead, for example, be utilising a degree of interleaving to generate their contribution to the output image.

Figure 11:
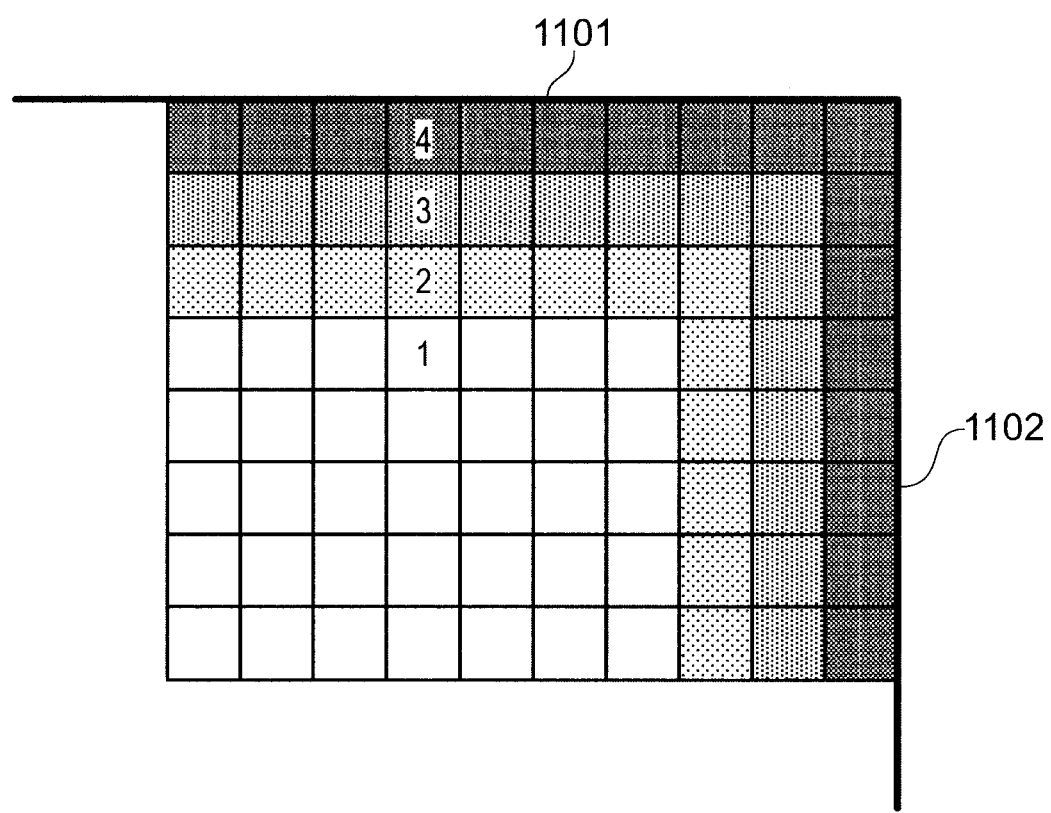
FIG. 11 schematically illustrates a portion of a modified image block.

FIG. 11 illustrates some of the pixels in a corner of a modified block with shading that corresponds to α value as described below. With reference to FIG. 11, to mitigate the effect of discontinuities, α values toward the edges 1101, 1102 of a modified block may gradually transition from zero toward their previously computed values, based upon the motion analysis described above. For example, over the sequence of four pixels numbered in the FIG. 11, progressing toward the edge of the modified block, the effective α value may be generated using the combinations in the table below:

| Pixel | α = 0 | α = computed |
|---|---|---|
| 1 | 100% | 0% |
| 2 | 75% | 25% |
| 3 | 50% | 50% |
| 4 | 25% | 75% |
| (outside) | n/a | 100% |

In the above table, pixel 1 is innermost within the modified block, and pixel 4 is on the edge of the block, as illustrated.

It will be appreciated however that the transition region may be of any suitable size, may not be the same size horizontally as it is vertically, and may be wholly within the modified block, wholly outside but adjacent to the modified block, or may span the edge of the modified block.

Where a pixel is near a corner of a block where two transition regions converge, its value is determined according to which edge it is closest to.

Where a modified block is the immediate neighbour of another modified block, such a transition region is not necessary where their edges join.

In an alternative embodiment, the categorisation of two blocks of successive image fields as having a large filed difference is determined by satisfying the inequality $$|DC_N - DC_{N-1}| > \text{Max}(SD_N, SD_{N-1}),$$

where all the terms are as defined previously, and the function Max returns the largest of it input values.

Optionally, the squares of $|DC_N-DC_{N-1}|$ and $(SD_N+SD_{N-1})$ or Max $(SD_N,SD_{N-1})$ may be used in the above calculations.

More generally, therefore, the determination of significant dissimilarity between corresponding blocks in successive image fields is based upon a comparison of a measure of the difference between these blocks with a measure of the variability of at least one of those blocks.

In an alternative embodiment, a tuning parameter Tuning-Param is also provided within the inequality, giving, for example, $$|DC_N-DC_{N-1}|*\text{TuningParam} > \text{Max } (SD_N,SD_{N-1}) \text{ or}$$

$$|DC_N-DC_{N-1}|*\text{TuningParam} > (SD_N+SD_{N-1})/2$$

as applicable.

This tuning parameter enables an adjustment or weighting of when the inequality is satisfied, thereby providing greater or lesser sensitivity to changes between image fields. It will be appreciated that the tuning parameter could be additive instead of or in addition to being multiplicative.

It will be appreciated that potentially more than one tuning, or weighting, parameter may be used. For example, if $|DC_N-DC_{N-1}|*\text{small} > \text{Max}(SD_N,SD_{N-1})$ then limit α to 25% of value;

if $|DC_N-DC_{N-1}|*\text{medium} > \text{Max}(SD_N,SD_{N-1})$ then limit α to 50% of value;

if $|DC_N-DC_{N-1}|*\text{large} > \text{Max}(SD_N,SD_{N-1})$ then limit α to 75% of value;

else α remains unchanged where small, medium and large are different tuning parameter values, each applicable in turn. The modification to α could be any appropriate modification, and optionally a function of some or all of $DC_N$, $DC_{N-1}$, $SD_N$, or $SD_{N-1}$ values.

In an embodiment of the present invention, the determination of block dissimilarity and any consequent modification of α value data is made by the inter-field block matcher 600.

However it will be appreciated by a person skilled in the art that this function may in principle be implemented by any element of the converter 70 that is located in a suitable part of the image processing chain to perform such a function.

Figure 12:
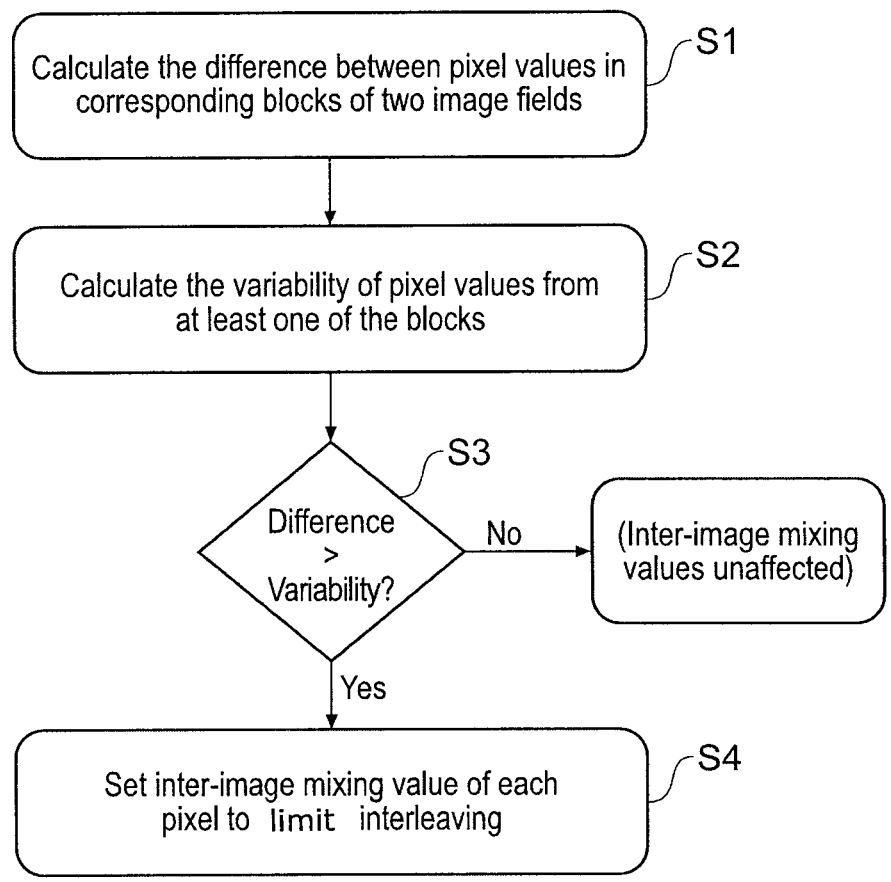
FIG. 12 schematically illustrates a flow diagram of a method of image processing.

A corresponding method of image processing for converting interlaced images to progressive scan images is now described with reference to FIG. 12, and comprises the steps of:

Calculating (s1) a difference measure of the difference in pixel values between corresponding blocks of a current image field and a preceding image field;

Calculating (s2) a variability measure of the variability of pixel values from at least one of said corresponding blocks;

Determining (s3) whether the difference measure exceeds the variability measure; and if the difference measure exceeds the variability measure,
setting (s4) an inter-image mixing value for each pixel in the corresponding block of the current image field to indicate that the current image field should not be mixed with the preceding image field at that pixel position or should be mixed to at most a predetermined extent (e.g. by setting the $\alpha$ value to 0, thereby indicating motion and in turn prompting only the use of the spatially interpolated version of the pixel, or by setting the $\alpha$ value to a maximum proportion of its initial value, the extent of mixing is limited).

If the difference measure does not exceed the variability measure, then the values of $\alpha$ are unaffected.

It will be appreciated by a person skilled in the art that variations in the above method corresponding to the various operations of the apparatus disclosed herein are considered to be within the scope of the present invention, including:

using an $\alpha$ value transition region at the edges of a block;
using alternative inequalities to determine whether there is a large field difference between blocks; and
using a tuning parameter.

It will further be appreciated by a person skilled in the art that in the above embodiments, the comparison between the current and previous image fields may alternatively be between the current and future image fields, where a delay of one or more image fields has been applied during processing, thereby enabling acquisition of the adjacent future image field. Thus the comparison may be performed between the notional current frame and an adjacent field being the preceding or succeeding image field.

It will also be appreciated that rather than using an $\alpha$ value of zero to denote no motion and hence that only spatial interpolation should be used, alternatively an $\alpha$ value close to zero may be used where the resultant degree of mixing is below a threshold level (the threshold level being an empirically determined level acceptable—either due to being visually inoffensive or visually undetectable—to a typical or average viewer of the resulting image).

Thus more generally, in the above embodiments optionally the inter image mixing value $\alpha$ is set to indicate that the current image field is mixed to only to a limited extent with the adjacent image field, or is not mixed at all.

It will be appreciated by a person skilled in the art that the reference to the mixing of fields $F_N$ and $F_{N-1}$ is one of several potential mixing options available for interlacing images in an image sequence. Generalising $F_N$ to $F_{Sx}$ and $F_{N-1}$ to $F_M$, a selection of interpolation modes may be defined as:

Mode 1: Zero field system delay (as in the description)—
$F_{Sx}$=interpolated field associated with field $F_N$
$F_M$=field $F_{N-1}$ Mode 2: One field system delay, backward mixing—
$F_{Sx}$=interpolated field associated with field $F_{N-1}$
$F_M$=field $F_{N-2}$ Mode 3: One field system delay, forward mixing—
$F_{Sx}$=interpolated field associated with field $F_{N-1}$
$F_M$=field $F_N$.

Consequently, for example, the mixed pixel value would equal $\alpha F_M + (1-\alpha)F_{Sx}$.

It will be appreciated that the invention can be implemented in programmable or semi-programmable hardware operating under the control of appropriate software. This could be a general purpose computer or arrangements such as an ASIC (application specific integrated circuit) or an FPGA (field programmable gate array). The software could be supplied on a data carrier or storage medium such as a disk or solid state memory, or via a transmission medium such as a network or internet connection as a signal, or via combinations of these.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

APPENDIX

Some example Parameters:

|  | YPbPr setting | RGB setting |
|---|---|---|
| $HFC_{thresh1}$ | 40 | 40 |
| $HFC_{thresh2}$ | 8 | 8 |
| $HFC_{allowance}$ | 218 | 128 |
| $HFC_{penalty}$ | 10 | 25 |
| thresh1 | 60 | 120 |
| thresh2 | 20 | 50 |
| thresh3 | 25 | 60 |
| TuningParam | 0.5 | 0.5 |

What is claimed is:

1. A method of image processing comprising the steps of:
   estimating pixel motion values for pixels in blocks of a current image field;
   calculating a difference measure of a difference in pixel brightness or color values between corresponding blocks of the current image field and an adjacent image field;
   calculating a variability measure of a variability of pixel brightness or color values in respect of at least one of said corresponding blocks;
   determining whether the difference measure exceeds the variability measure; and
   if the difference measure exceeds the variability measure, overriding estimated pixel motion values to set respective inter-image mixing values for pixels in the corresponding block of the current image field to indicate that the current image field should not be mixed with the adjacent image field at that pixel position.

2. The method of image processing according to claim 1, wherein the adjacent image field is the preceding image field.

3. The method of image processing according to claim 1, wherein the step of calculating the difference measure comprises the steps of:
   determining an average value for each of the corresponding blocks based upon the respective pixel values of each of the corresponding blocks; and
   subtracting one of the average values from the other average value and taking a modulus of the resulting value to be the difference measure.

4. The method of image processing according to claim 1, wherein the step of calculating the variability measure comprises the steps of:
determining a variability value for each of the corresponding blocks based upon the respective pixel values of each of the corresponding blocks; and
taking an average of the determined variability values of the corresponding blocks to be the variability measure.

5. The method of image processing according to claim 4, wherein the variability value for each of the corresponding blocks is a standard deviation based upon the respective pixel values of each of the corresponding blocks.

6. The method of image processing according to claim 1, wherein the step of calculating the variability measure comprises the steps of:
determining a variability value for each of the corresponding blocks based upon the respective pixel values of each of the corresponding blocks; and
taking variability value indicative of the greatest block variability of the corresponding blocks to be the variability measure.

7. The method of image processing according to claim 1, further comprising the step of:
including at least one weighting value within the comparison of the difference measure and the variability measure, the at least one weighting value being adjustable to vary the point at which pixel data causes the difference measure to exceed the variability measure.

8. The method of image processing according to claim 1, wherein, for a series of pixels at predetermined positions with respect to an edge of the corresponding block of the current image field, inter-image mixing values transition away from a centre of the corresponding block of the current image field over the series of pixels from a value indicating that the current image field should not be mixed with the adjacent image field, to a value based upon motion analysis.

9. A non-transitory storage medium comprising computer readable instructions that, when executed by a computer, cause the computer to carry out the method of claim 1.

10. The method of image processing according to claim 1, wherein
the difference measure is calculated according to Expression (1)

$$|DC_N - DC_{N-1}|$$ Expression (1), $DC_N$ and $DC_{N-1}$ are averages of the pixel brightness or color values within corresponding blocks in the current (N) image field and a preceding (N-1) image field, respectively,
the variability measure is calculated according to Expression (2)

$$(SD_N + SD_{N-1})/2$$ Expression (2), and $SD_N$ and $SD_{N-1}$ are the standard deviations of the pixel brightness or color values within corresponding blocks in the current (N) image field and the preceding (N-1) image field, respectively.

11. The method of image processing according to claim 1, wherein
the difference measure is calculated according to Expression (1)

$$|DC_N - DC_{N-1}|$$ Expression (1), $DC_N$ and $DC_{N-1}$ are averages of the pixel brightness or color values within corresponding blocks in the current (N) image field and a preceding (N-1) image field, respectively,
the variability measure is calculated according to Expression (2)

$$\text{Max}(SD_N, SD_{N-1})$$ Expression (2), and $SD_N$ and $SD_{N-1}$ are the standard deviations of the pixel brightness or color values within corresponding blocks in the current (N) image field and the preceding (N-1) image field, respectively.

12. An image processing apparatus, comprising:
circuitry configured to:
estimate pixel motion values in blocks of a current image field;
calculate a difference measure of a difference in pixel brightness or color values between corresponding blocks of the current image field and an adjacent image field;
calculate a variability measure of a variability of pixel brightness or color values in respect of at least one of said corresponding blocks;
determine whether the difference measure exceeds the variability measure; and
override estimated pixel motion values to set an inter-image mixing value of a pixel, wherein:
if, in operation, the circuitry determines that the difference measure exceeds the variability measure, then:
the circuitry overrides estimated pixel motion values to set respective inter-image mixing values for pixels in the corresponding block of the current image field to indicate that the current image field should not be mixed with the adjacent image field at that pixel position.

13. The image processing apparatus according to claim 9, wherein the adjacent image field is the preceding image field.

14. The image processing apparatus according to claim 12, wherein the circuitry is further configured to:
determine an average value for each of the corresponding blocks based upon the respective pixel values of each of the corresponding blocks; and
subtract one of the average values from the other average value and take a modulus of the resulting value to be the difference measure.

15. The image processing apparatus according to claim 12, wherein the circuitry is further configured to:
determine a variability value for each of the corresponding blocks based upon the respective pixel values of each of the corresponding blocks; and
take an average of the determined variability values of the corresponding blocks to be the variability measure.

16. The image processing apparatus according to claim 15, wherein the variability value for each of the corresponding blocks is a standard deviation based upon the respective pixel values of each of the corresponding blocks.

17. The image processing apparatus according to claim 12, wherein the circuitry is further configured to:
determine a variability value for each of the corresponding blocks based upon the respective pixel values of each of the corresponding blocks; and
take the larger of the standard deviation values of the corresponding blocks to be the variability measure.

18. The image processing apparatus according to claim 12, wherein at least a first weighting value is adjustable in operation to vary the point at which pixel data causes the difference measure to exceed the variability measure.

19. The image processing apparatus according to claim 12, wherein the circuitry, for a series of pixels at predetermined positions with respect to an edge of the corresponding block of the current image field, is further configured to modify inter-image mixing values so as to transition away from a center of the corresponding block of the current image field over the series of pixels from a value indicating that the current image field should not be mixed with the adjacent image field, to a value based upon motion analysis.

20. A non-transitory storage medium comprising computer readable instructions that, when executed by a computer, cause the computer to operate as an image processing apparatus according to claim 12.

* * * * *